US012202158B2

(12) United States Patent
Kopelas et al.

(10) Patent No.: US 12,202,158 B2
(45) Date of Patent: Jan. 21, 2025

(54) COUPLING MECHANISM

(71) Applicant: BIC Violex Single Member S.A., Anoixi (GR)

(72) Inventors: Panagiotis Kopelas, Anoixi (GR); Dimitrios Efthimiadis, Anoixi (GR); Nikolaos Chatzigrigoriou, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 211 days.

(21) Appl. No.: 17/995,040

(22) PCT Filed: Feb. 23, 2021

(86) PCT No.: PCT/EP2021/054455
§ 371 (c)(1),
(2) Date: Sep. 29, 2022

(87) PCT Pub. No.: WO2021/197714
PCT Pub. Date: Oct. 7, 2021

(65) Prior Publication Data

US 2023/0143109 A1 May 11, 2023

(30) Foreign Application Priority Data

Mar. 30, 2020 (EP) .................................... 20166674

(51) Int. Cl.
*B26B 21/52* (2006.01)

(52) U.S. Cl.
CPC .................................. *B26B 21/521* (2013.01)

(58) Field of Classification Search
None
See application file for complete search history.

(56) References Cited

U.S. PATENT DOCUMENTS

| | | | |
|---|---|---|---|
| 4,739,553 | A | 4/1988 | Lazarchik |
| 5,953,824 | A | 9/1999 | Ferraro |

(Continued)

FOREIGN PATENT DOCUMENTS

| | | |
|---|---|---|
| EP | 0402105 | 12/1990 |
| WO | 9836878 | 10/1998 |

(Continued)

OTHER PUBLICATIONS

International Search Report and Written Opinion dated Jun. 14, 2021 of the of the Application No. PCT/EP2021/054455, filed on Feb. 23, 2021.

*Primary Examiner* — Hwei-Siu C Payer
(74) *Attorney, Agent, or Firm* — BookoffMcAndrews, PLLC

(57) ABSTRACT

A coupling mechanism 10 comprising a first coupling element 20 having a first engagement surface 34 configured to pivot about a pivot axis located external to the coupling mechanism, a second coupling element 40 including a second engagement surface 52 configured to come into contact with the one or more first engagement surface, the second coupling element being capable of moving from a first position to a second position and from the second position to the first position, a third coupling element 60 configured to support the first coupling element and the second coupling element, a stop 58 positioned inwardly of the first coupling element configured to impede pivoting of the first coupling element. The stop impedes pivoting of the first coupling element when the second coupling element is in the first position and the stop no longer impedes movement of the first coupling element when the second coupling element is in the second position.

14 Claims, 5 Drawing Sheets

(56) References Cited

U.S. PATENT DOCUMENTS

| | | | | |
|---|---|---|---|---|
| 11,679,523 | B2 * | 6/2023 | Kopelas | B26B 21/222 30/51 |
| 11,931,911 | B2 * | 3/2024 | Kopelas | B26B 21/225 |
| 2016/0101531 | A1 | 4/2016 | Bunnell | |
| 2021/0354321 | A1 * | 11/2021 | Kopelas | B26B 21/521 |
| 2023/0143109 | A1 * | 5/2023 | Kopelas | B26B 21/521 30/527 |

FOREIGN PATENT DOCUMENTS

| | | |
|---|---|---|
| WO | 2010037418 | 4/2010 |
| WO | 2017174120 | 10/2017 |

* cited by examiner

COUPLING MECHANISM

FIELD

This application is a national stage application of International Application No. PCT/EP2021/054455, filed on Feb. 23, 2021, now published as WO/2021/197714 and which claims benefit from European patent application EP20166674.0 filed on 30 Mar. 2020, the entirety of the '455 application is incorporated herein by reference.

The present disclosure relates generally to the field of skincare, and in particular to shaving. More specifically, the present disclosure relates to a coupling mechanism for connecting a replaceable shaving cartridge of a shaving device to a handle of a shaving device.

BACKGROUND

A typical handheld shaving device includes a handle and replaceable shaving cartridges or heads which are configured to connect to the handle via a coupling mechanism. The coupling mechanism should allow for engagement and disengagement of the shaving cartridge to and from the handle. However, many presently available coupling mechanisms are unable to maintain engagement of the shaving cartridge to the handle when force is applied to the shaving cartridge, which leads to unintentional disengagement of the shaving cartridge from the handle.

It is desirable to provide an improved coupling mechanism for engaging and disengaging a shaving cartridge of a shaving device to a handle of a shaving device, while also reducing unintentional disengagement of the shaving cartridge from the handle.

SUMMARY

According to aspects of the present disclosure, a coupling mechanism for engaging and disengaging a shaving cartridge of a shaving device comprises a first coupling element having one or more first engagement surface configured to pivot about a pivot axis, a second coupling element including one or more second engagement surface configured to contact the one or more first engagement surface, the second coupling element being capable of moving in a first direction from a first position to a second position and in a second direction from the second position to the first position, a stop positioned inwardly of the first coupling element configured to impede pivoting of the first coupling element, and wherein, the stop impedes pivoting of the first coupling element when the second coupling element is in the first position and the stop no longer impedes movement of the first coupling element when the second coupling element is in the second position.

The pivot axis is located external to the coupling mechanism. The coupling mechanism further comprises a third coupling element that is configured to support the first coupling element and the second coupling element.

According to aspects of the disclosure, the second coupling element may be positioned inwardly of the first coupling element.

According to aspects of the disclosure, the first coupling element may include one or more first coupling member, the one or more first coupling member may include a peripheral attachment portion configured to be received by a shaving cartridge of a shaving device, and the peripheral attachment portion may be offset inwardly of the pivot axis.

According to aspects of the disclosure, a difference in a first distance between the peripheral attachment portions and a second distance between the pivot axes may be in the range of 2.1 mm and 2.3 mm.

According to aspects of the disclosure, the second coupling element may include a ramp and movement of an actuator along the ramp may cause the second coupling element to move in the first direction from the first position toward the second position.

According to aspects of the disclosure, the one or more second engagement surface may come into contact with and apply a force on the one or more first engagement surface when the second coupling element is moving in the first direction.

According to aspects of the disclosure, application of the force on the one or more first engagement surface may cause the one or more coupling member to pivot and the peripheral attachment portion to move inwardly.

According to aspects of the disclosure, the third coupling element may be configured to be arranged in a stacked relationship with the first coupling element and the second coupling element.

According to aspects of the disclosure, the first coupling element may be configured to pivot along a surface of the third coupling element.

According to aspects of the disclosure, the second coupling element may be biased toward the first position by a bias member.

According to aspects of the disclosure, the stop may be included on the second coupling element.

According to aspects of the disclosure, the first coupling element may include a pair of opposing coupling members.

According to aspects of the disclosure, the one or more second engagement surfaces may be projections extending from the second coupling element.

According to aspects of the disclosure, a shaving device may comprise the coupling mechanism according to any aspect described above.

In the manner described and according to aspects illustrated herein, the coupling mechanism may allow for engagement and disengagement of the shaving cartridge while also improving retention of the shaving cartridge to the handle to avoid unintentional disengagement of the shaving cartridge from the handle.

BRIEF DESCRIPTION OF THE DRAWINGS

Aspects of an embodiment will be described in reference to the drawings, where like numerals reflect like elements.

DETAILED DESCRIPTION

Figure 1:
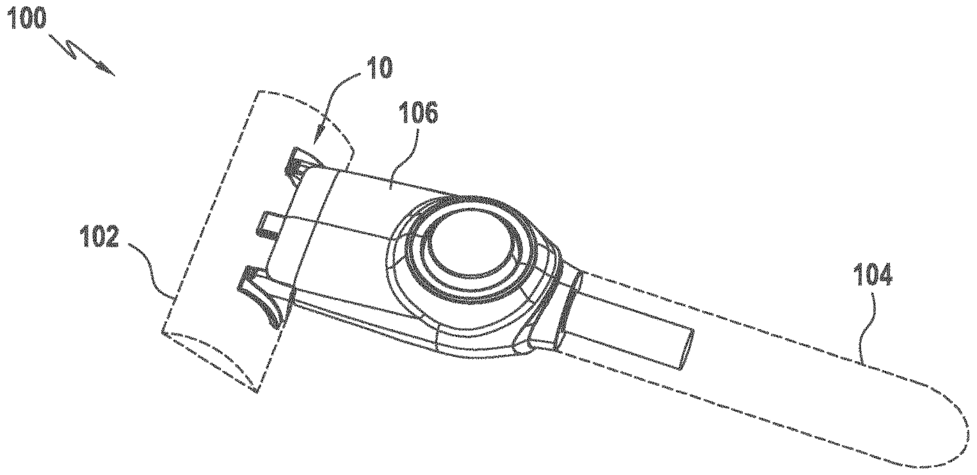
FIG. 1 is a side perspective view of a coupling mechanism within a handheld shaving device according to aspects of the disclosure.

An embodiment of the coupling mechanism according to aspects of the disclosure will now be described with reference to FIGS. 1-7D, wherein like numerals represent like parts, and will generally be referred to by the reference numeral 10. Although the coupling mechanism 10 is described with reference to specific examples, it should be understood that modifications and changes may be made to these examples without going beyond the general scope as defined by the claims. In particular, individual characteristics of the various embodiments shown and/or mentioned herein may be combined in additional embodiments. Consequently, the description and the drawings should be considered in a sense that is illustrative rather than restrictive. The Figures, which are not necessarily to scale, depict illustrative aspects and are not intended to limit the scope of the disclosure. The illustrative aspects depicted are intended only as exemplary.

The term "exemplary" is used in the sense of "example," rather than "ideal." While aspects of the disclosure are amenable to various modifications and alternative forms, specifics thereof have been shown by way of example in the drawings and will be described in detail. It should be understood, however, that the intention is not to limit aspects of the disclosure to the particular embodiment(s) described. On the contrary, the intention of this disclosure is to cover all modifications, equivalents, and alternatives falling within the scope of the disclosure.

Various materials, methods of construction and methods of fastening will be discussed in the context of the disclosed embodiment(s). Those skilled in the art will recognize known substitutes for the materials, construction methods, and fastening methods, all of which are contemplated as compatible with the disclosed embodiment(s) and are intended to be encompassed by the appended claims.

As used in this disclosure and the appended claims, the singular forms "a," "an," and "the" include plural referents unless the content clearly dictates otherwise. As used in this disclosure and the appended claims, the term "or" is generally employed in its sense including "and/or" unless the content clearly dictates otherwise.

Throughout the description, including the claims, the terms "comprising a," "including a," and "having a" should be understood as being synonymous with "comprising one or more," "including one or more," and "having one or more" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially," "approximately," and "generally" should be understood to mean falling within such accepted tolerances.

When an element or feature is referred to herein as being "on," "engaged to," "connected to," or "coupled to" another element or feature, it may be directly on, engaged, connected, or coupled to the other element or feature, or intervening elements or features may be present. In contrast, when an element or feature is referred to as being "directly on," "directly engaged to," "directly connected to," or "directly coupled to" another element or feature, there may be no intervening elements or features present. Other words used to describe the relationship between elements or features should be interpreted in a like fashion (e.g., "between" versus "directly between," "adjacent" versus "directly adjacent," etc.).

Spatially relative terms, such as "top," "bottom," "middle," "inner," "outer," "beneath," "below," "lower," "above," "upper," and the like, may be used herein for ease of description to describe one element or feature's relationship to another element(s) or feature(s) as illustrated in the drawings. Spatially relative terms may be intended to encompass different orientations of a device in use or operation in addition to the orientation depicted in the drawings. For example, if the device in the drawings is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the terms "first," "second," etc. may be used herein to describe various elements, components, regions, layers, sections, and/or parameters, these elements, components, regions, layers, sections, and/or parameters should not be limited by these terms. These terms are only used to distinguish one element, component, region, layer, or section from another region, layer, or section. Thus, a first element, component, region, layer, or section discussed herein could be termed a second element, component, region, layer, or section without departing from the teachings of the present disclosure.

Figure 2:
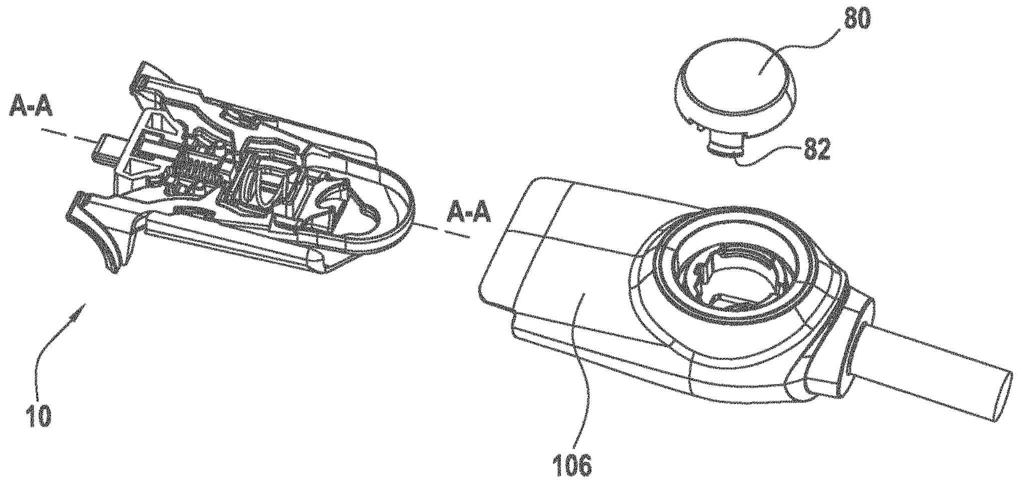
FIG. 2 is a side perspective exploded view of a portion of the handheld shaving device.
Figure 3:
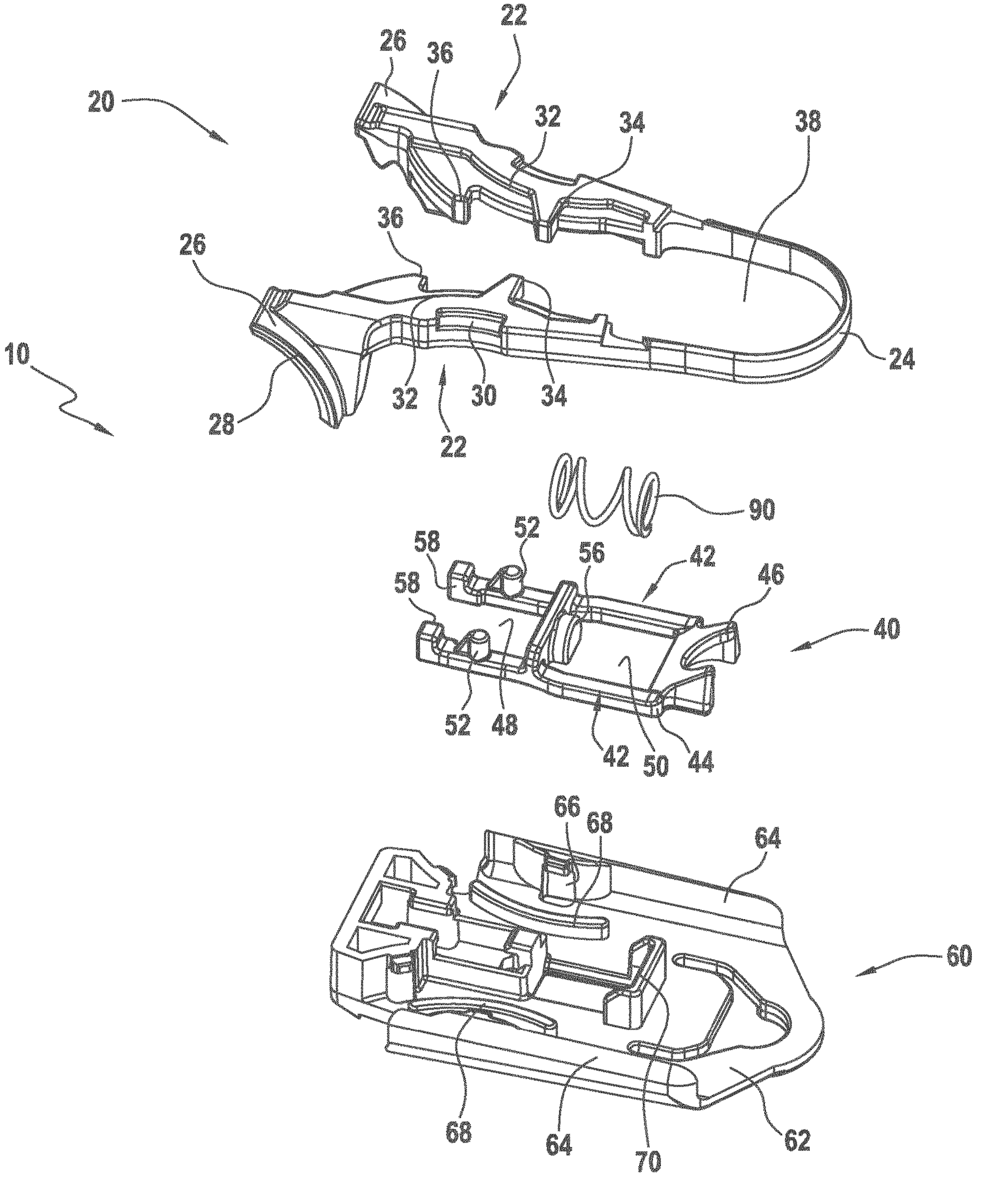
FIG. 3 is a side perspective exploded view of the coupling mechanism of FIG. 1.
Figure 4:
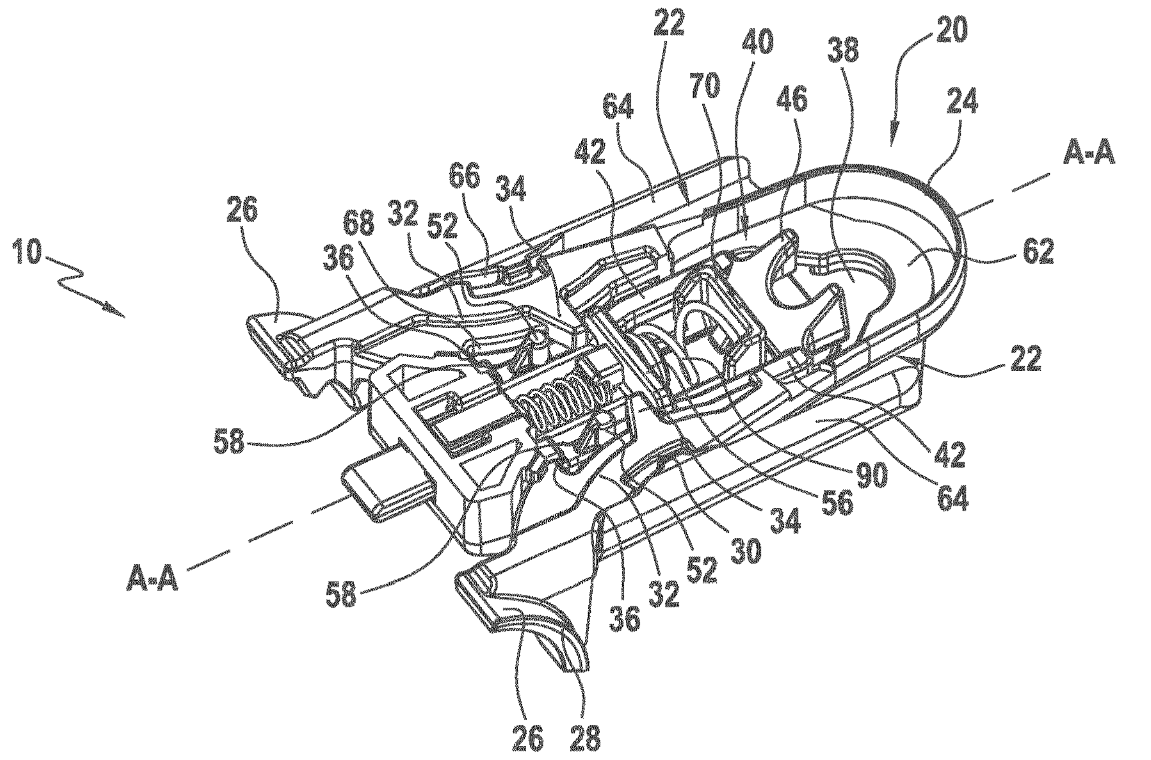
FIG. 4 is a top perspective view of the coupling mechanism of FIG. 1.
Figure 5:
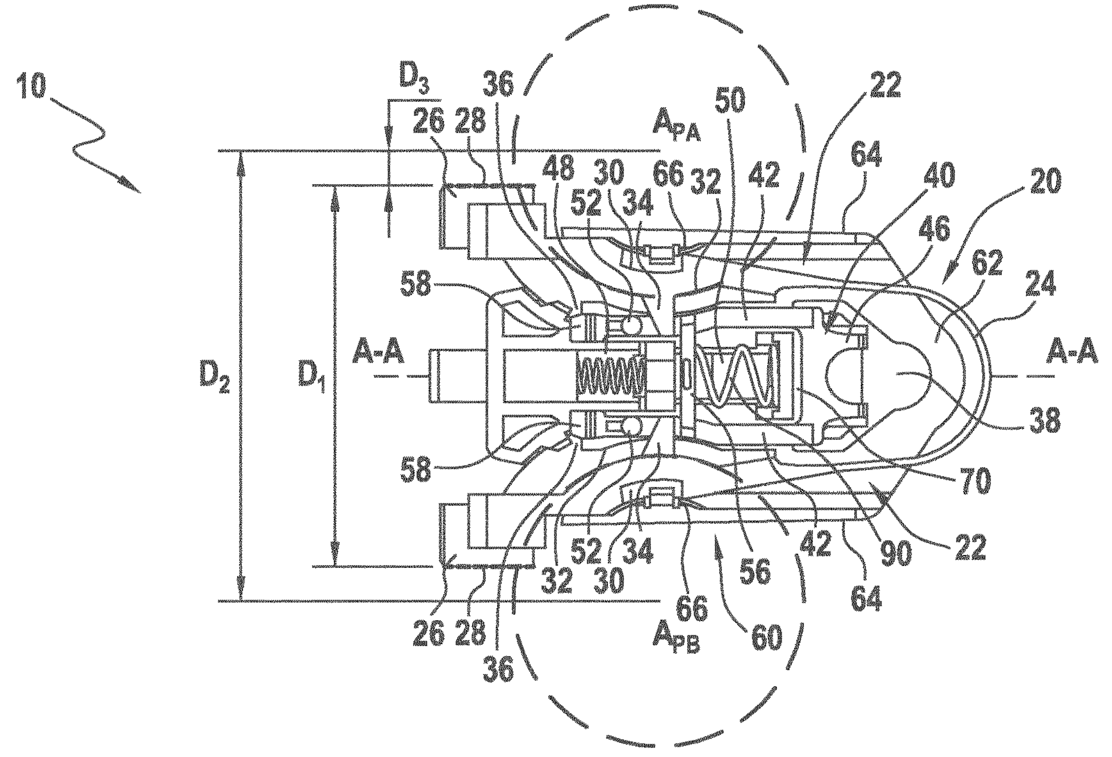
FIG. 5 is top view of the coupling mechanism of FIG. 1.

As shown in FIGS. 1-2, the coupling mechanism 10 may be configured to couple parts of a product, such as a handheld shaving device (hereafter, "the product") 100 having a head/replaceable shaving cartridge 102 and a handle 104. The coupling mechanism 10 may be included within a housing 106 of the handle 104. The housing 106 may be directly connected to the handle 104. It is also contemplated that the housing 106 may be indirectly connected to the handle 104. Additionally, it is contemplated that the housing 106 may be integral to the handle 104. As shown in FIGS. 3-5, the coupling mechanism 10 may be bisected by an axis A-A and include a first coupling element 20, a second coupling element 40, a third coupling element 60, and an actuator 80 configured to allow for engagement and disengagement of the shaving cartridge 102 from the handle 104, while also improving retention of the shaving cartridge 102 to the handle 104 to avoid unintentional disengagement of the shaving cartridge 102 from the handle 104. The first coupling element 20, second coupling element 40, and third coupling element 60 may be configured to be arranged in a stacked relationship. In this arrangement, the second coupling element 40 may fit between and be fully-surrounded by the first coupling element 20 and the first coupling element 20 and the second coupling element 40 may be supported upon and/or within the third coupling element 60. In the disclosed embodiment, the coupling mechanism 10 may be attached to the housing 106 of the handle 104. It is contemplated that the coupling mechanism 10 may be attached to the handle 104 via an attachment connection such as a snap-fit or press-fit connection.

As shown in FIG. 3, the first coupling element 20 may include one or more elastically deformable coupling member (arm) 22 extending from a root 24. In the disclosed embodiment, the first coupling element 20 may include a pair of opposing coupling members 22 extending from the root 24. The root 24 may be radial and/or u-shaped to facilitate movement and/or pivoting of the coupling members 22. It is contemplated that the terms "pivot" and "pivoting," as used herein, may encompass movements which are made with respect to a fixed point, such as a rotation. Each coupling member 22 may include a peripheral attachment portion 26 configured to be received and retained within the shaving cartridge 102 of the product 100. Due to pivoting of the coupling members 22, each coupling member 22, and thus each peripheral attachment portion 26, may be capable transitioning between a non-retracted position, wherein the each peripheral attachment portion 26 may be retained in the shaving cartridge 102, and a retracted position, wherein the peripheral attachment portion 26 may no longer be retained in the shaving cartridge 102. Each peripheral attachment portion 26 may extend outwardly to an attachment surface 28 which may be the outermost surface of each coupling member 22 and the coupling mechanism 10. It is contemplated that the terms "outward," "outwardly," and "outermost," as used herein, may be understood to mean a direction away and/or farther from the axis A-A. The attachment surface 28 of the peripheral attachment portion 26 may be arcuate. In the non-retracted position of the peripheral attachment portion 26 (see FIGS. 5 and 7A), each attachment surface 28 may be located at a first distance $D_1$ from each other. In the disclosed embodiment, the first distance $D_1$ may be within a range of 21 mm to 23 mm, but may most specifically be 22 mm±0.1 mm. In the retracted position of the peripheral attachment portion 26 (see FIG. 7D), the first distance $D_1$ between each attachment surface 28 may be less than 20 mm, particularly within a range of 18 mm to 20 mm, but may most specifically be 19.8 mm±0.1 mm.

As illustrated in FIGS. 3-4 and 7A-7D, the first coupling element 20 may include arcuate pivot surfaces 30, 32 configured to pivot against complementary arcuate pivot surfaces 66, 68 of the third coupling element 60. In the disclosed embodiment, the pivot surfaces 30, 32 of each coupling member 22 may include an outer pivot surface 30 having a concave radial geometry configured to pivot against a first complementary radial surface 66 of the third coupling element 60. The pivot surfaces 30, 32 of each coupling member 22 may also include an inner pivot surface 32 having a convex radial geometry configured to pivot against a second complementary radial surface 68 of the third coupling element 60. As shown in FIG. 5, each coupling member 22, and thus the first coupling element 20, may pivot about a separate pivot axis $A_{PA}$, $A_{PB}$, respectively. Each pivot axis $A_{PA}$, $A_{PB}$ may be located external to the coupling mechanism 10. It is contemplated that the term "external" as used herein may be understood to mean a location outside sidewalls 64 of the third coupling element 60. The pivot axes $A_{PA}$, $A_{PB}$ may be spaced from each other by a second distance $D_2$. The second distance $D_2$ may be greater than the first distance $D_1$. In the disclosed embodiment, the second distance $D_2$ may be in the range of 26 mm and 32 mm, but may most specifically be 26.4 mm±0.1 mm. As such, each attachment surface 28, and thus each peripheral attachment portion 26, may be offset inwardly of each respective pivot axis $A_{PA}$, $A_{PB}$. It is contemplated that the terms "inward" and "inwardly," as used herein, may be understood to mean in a direction toward and/or closer to the axis A-A. In the disclosed embodiment, a third distance $D_3$ corresponding to a difference between the distance $D_1$ and each distance $D_2$ may be in the range of 1 mm and 5 mm, but may most specifically be 2.2 mm±0.1 mm. When a user attempts to pull the shaving cartridge 102 from the handle 104 by force, it may generate a torque on each coupling member 22. The torque may be applied at the outermost surfaces of the first coupling element 20, the attachment surfaces 28. As such, as each pivot axis $A_{PA}$, $A_{PB}$ may be offset outwardly at by third distance $D_3$ from the attachment surfaces 28, the torque may tend to push each coupling member 22 outwardly and not allow each coupling member 22 to retract, thereby maintaining retention of the peripheral attachment portions 26 within the shaving cartridge 102 and thus maintaining the engagement between the shaving cartridge 102 and the handle 104.

Each coupling member 22 may include a first engagement surface 34 and a second engagement surface 36 configured to engage and disengage surfaces 52, 58 included on the second coupling element 40. In the disclosed embodiment, the first coupling element 20 may include a pair of opposing first engagement surfaces 34 and a pair of opposing second engagement surfaces 36. Each first engagement surface 34 may function as a cam surface by which energy is received from surfaces 52 of the second coupling element 40. Each first engagement surface 34 and each second engagement surface 36 may project inwardly toward the axis A-A. Each first engagement surface 34 may be positioned between the second engagement surface 36 and the root 24. When each second engagement surface 36 is engaged with complementary surfaces 58 of the second coupling element 40, unintentional disengagement of the shaving cartridge 102 from the handle 104 may be blocked, as each coupling member 22 is then blocked from pivoting inwardly. When each second engagement surface 36 is disengaged from the complementary surfaces 58 of the second coupling element 40, disengagement of the shaving cartridge 102 from the handle 104 may no longer be blocked. Additionally, the first coupling element 22 may include a gap 38 extending from the first engagement surface 34 to the root 24 of the first coupling element 20. The gap 38 may allow for movement of the second coupling element 40 between the first coupling element 20.

As shown in FIG. 3, the second coupling element 40 may be configured to be positioned inwardly of the first coupling element 20. The second coupling element 40 may include a pair of arms 42 extending from a base 44. A ramp 46 may extend from the base 44 of the second coupling element 40. The ramp 46 may be configured to work in combination with the actuator 80 to cause movement of the second coupling element 40. One or more voids 48, 50 may be defined between the arms 42 of the second coupling element 40 for receiving a bias member 90 and/or a component 70 of the third coupling element 60. In the disclosed embodiment, a first void 48 and a second void 50 may be defined between the arms 42 of the second coupling element 40. The first void 48 may be defined between engagement surfaces and stops 52, 58 (discussed below) of the second coupling element 40. The second void 50 may be defined between a wall 56 of the second coupling element 40 and the base 44 of the second coupling element 40. The wall 56 of the second coupling element 40 may extend transverse to the axis A-A.

The second coupling element 40 may include one or more engagement surface (second engagement surface) (projection) 52 configured to come into contact with and apply a first force on a corresponding first engagement surface 34 of a corresponding coupling member 22 of the first coupling element 20. In the disclosed embodiment, the second coupling element 40 includes a pair of engagement surfaces 52. Each engagement surface 52 of the second coupling element 40 may extend perpendicular to the axis A-A. Each engagement surface 52 may extend from a corresponding arm 42 of the second coupling element 40. The wall 56 of the second coupling element 40 may be located between the engagement surfaces 52 of the second coupling element 40 and the base 44 of the second coupling element 40. The second coupling element 40 may also include one or more stop 58 extending transverse to the axis A-A. In the disclosed embodiment, the second coupling element 40 may include a pair of opposing stops 58. Each stop 58 may extend from a corresponding arm 42 of the second coupling element 40. Each stop 58 may be positioned inwardly of a corresponding second engagement surface 36 of each coupling member 22 of the first coupling element 20. As discussed above, each stop 58 may be configured to engage and disengage each corresponding second engagement surface 36 of each corresponding coupling member 22. When each stop 58 is engaged with the corresponding second engagement surfaces 36 of the first coupling element 20, pivoting of each coupling member 22 may be impeded, thereby further maintaining retention of the peripheral attachment portions 26 within the shaving cartridge 102. When each stop 58 is disengaged with the corresponding second engagement surfaces 36 of the first coupling element 20, pivoting of each coupling member 22 may no longer be impeded, thereby allowing detachment of the shaving cartridge 102 from the handle 104

As illustrated by FIGS. 7A-7D, the second coupling element 40 may be capable of moving in a first direction $d_1$ from a first position to a second position and in a second direction $d_2$ from the second position to the first position. In the disclosed embodiment, movement of the second coupling element 40 in the first direction $d_1$ may be a direction toward the root 24 of the first coupling element 20 and movement of the second coupling element 40 in the second direction $d_2$ may be a direction toward the peripheral attachment portions 26 of the first coupling element 20. It is contemplated that the first position of the second coupling element 40 may be a rest position wherein the stops 58 of the second coupling element 40 may be engaged with the second engagement surfaces 36 of the first coupling element 20, so that pivoting of the coupling members 22 may be blocked (see FIG. 7A) and the peripheral attachment portions 26 may be in the non-retracted position and retained within the shaving cartridge 102. It is contemplated that the second position of the second coupling element 40 may be a position wherein the stops 58 of the second coupling element 40 may be disengaged from the second engagement surfaces 36 of the first coupling element 20, so that pivoting of the coupling members 22 is no longer blocked and the peripheral attachment portions 26 may be in the retracted position and no longer retained within the shaving cartridge 102 (see FIGS. 7C-7D). Additionally or alternatively, it is contemplated that the second position of the second coupling element 40 may correspond to a shaving cartridge disengagement position wherein the actuator 90 is fully-pressed. The second coupling element 40 may be biased toward the first position by a bias member 90. In the disclosed embodiment, the bias member 90 may be a coil spring. The bias member 90 may be secured between the wall 56 of the second coupling element 40 and a wall 70 of the third coupling element 60. The wall 70 of the third coupling element 60 may extend through the second void 50 of the second coupling element 40. The second coupling element 40 may move in the first and second directions $d_1$, $d_2$ between the coupling members 22 of the first coupling element 20.

Figure 6A:
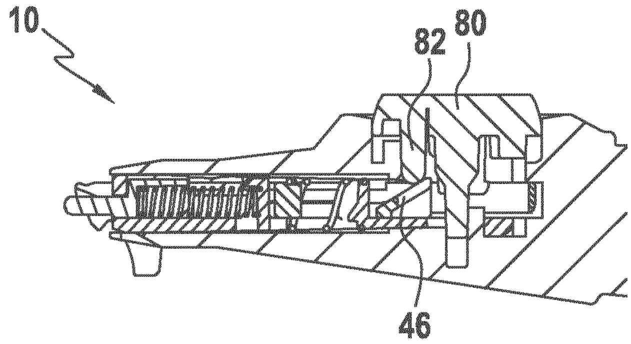
FIG. 6A is side view of the coupling mechanism of FIG. 1, with emphasis on an actuator of the coupling mechanism.
Figure 6B:
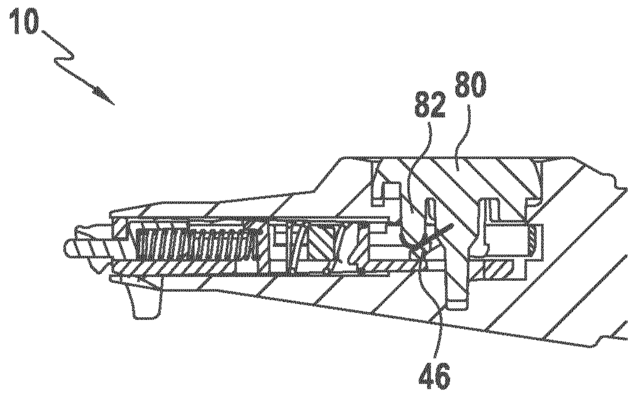
FIG. 6B is a side view of the coupling mechanism of FIG. 1, with emphasis on the actuator of the coupling mechanism when the actuator is pressed by a user.
Figure 7A:
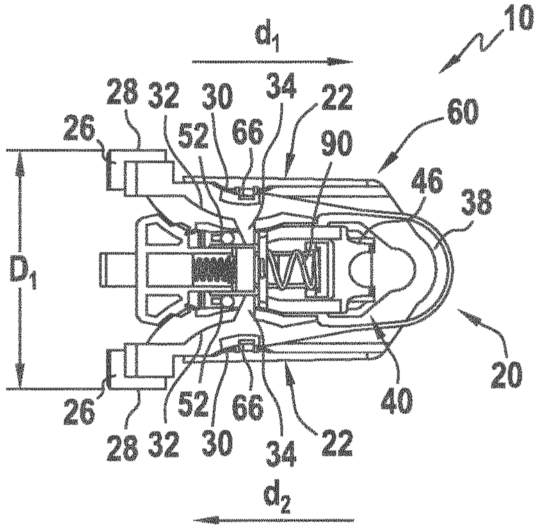
FIG. 7A is a top view of the coupling mechanism of FIG. 1, showing a second coupling element of the coupling mechanism in a first position.
Figure 7B:
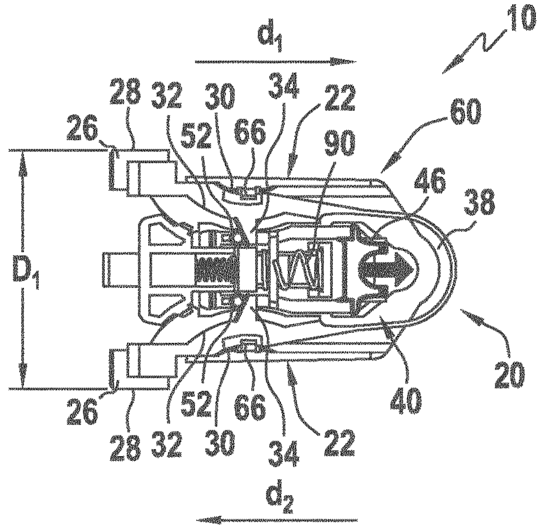
FIG. 7B is a top view of the coupling mechanism of FIG. 1, showing the second coupling element of the coupling mechanism transitioning from the first position toward a second position.
Figure 7C:
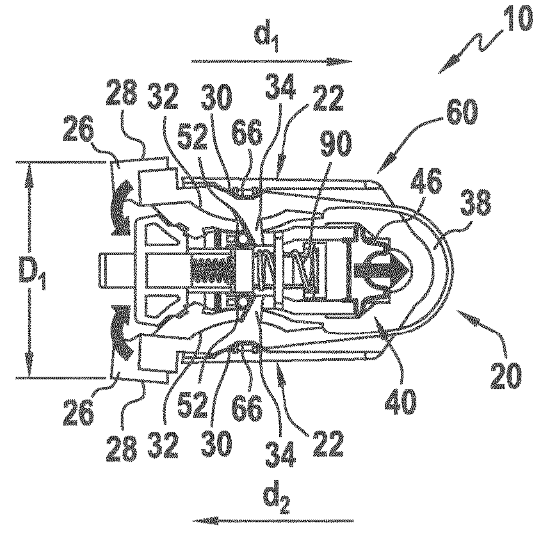
FIG. 7C is a top view of the coupling mechanism of FIG. 1, showing the second coupling element of the coupling mechanism transitioning from the first position toward the second position.
Figure 7D:
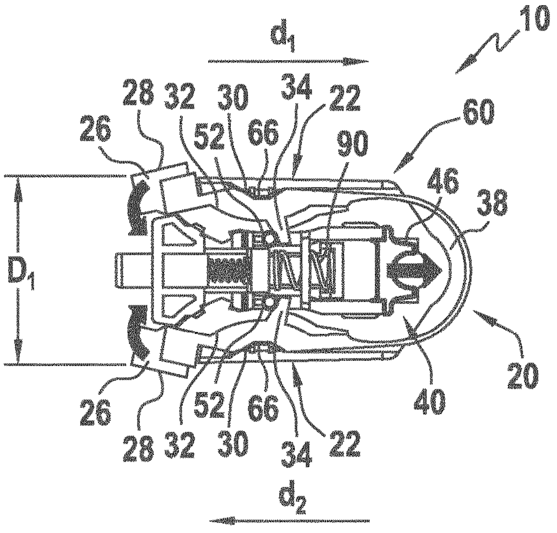
FIG. 7D is a top view of the coupling mechanism of FIG. 1, showing the second coupling element of the coupling mechanism in the second position.

As shown in FIGS. 6A-6B, movement of the second coupling element 40 may be caused by the actuator 80 of the coupling mechanism 10. In the disclosed embodiment, the actuator 80 is a push-button actuator. The actuator 80 may be positioned above the second coupling element 40. The actuator 80 may include a pin 82 which extends perpendicular to the axis A-A toward the second coupling element 40. The pin 82 of the actuator 80 may be configured to move toward the second coupling element 40 when the actuator is pressed by a user. The pin 82 of the actuator 80 may come into contact with and push against the ramp 46 of the second coupling element 40 by applying a force on the ramp 46 when pressed by a user. Application of force may cause the pin 82 to slide along the ramp 46 in the second direction $d_2$ (see FIG. 6B). Referring back to FIGS. 7A-7D, sliding along the ramp 46 in the second direction $d_2$ may cause the second coupling element 40 to compress the bias member 90 and move in the first direction $d_1$ toward the second position (see FIGS. 7A-7B). Movement in the first direction $d_1$ toward the second position may cause the each stop 58 of the second coupling element 40 to no longer engage the each second engagement surface 36 of the first coupling element 20 and no longer impede pivoting of the coupling members 22 of the first coupling element 20 (see FIGS. 7B-7D). Movement in the first direction $d_1$ toward the second position may also cause the first engagement surfaces 52 of the second coupling element 40 to engage the first engagement surfaces 34 of the first coupling element 20 and apply force on the first engagement surfaces 34 of the first coupling element 20 (see FIGS. 7B-7D). Application of force by the first engagement surfaces 52 of the second coupling element 40 on the first engagement surfaces 34 of the first coupling element 20 may push the first engagement surfaces 34 of the first coupling element 20 in the first direction $d_1$. Pushing the first engagement surfaces 34 of the first coupling element 20 in the first direction $d_1$ may cause each coupling member 22, and thus each peripheral attachment portion 26, to pivot inwardly toward the axis A-A about each corresponding pivot axis $A_{PA}$, $A_{PB}$, thereby moving out of retention within the shaving cartridge 102. In this manner, the coupling mechanism 10 may allow the shaving cartridge 102 to detach from the handle 104.

As shown in FIG. 3, the third coupling element 60 may include a frame 62 configured to receive and support the first coupling element 20 and the second coupling element 40. The wall 70 of the third coupling element 60 may extend from the frame 62 of the third coupling element 60. The third coupling element 60 may include a pair of axially extending sidewalls 64. Each sidewall 64 may include a first inner pivot surface 66 complementary to the outer pivot surfaces 30 of the first coupling element 20. In the disclosed embodiment, each first inner pivot surface 66 may include convex radial geometry complementary to the outer pivot surface 30 of the first coupling element 20. The third coupling element 60 may also include a second inner pivot surface 68 which may include a concave radial geometry complementary to the inner pivot surface 32 of the first coupling element 20. Each first engagement surface 34 of the first coupling element 20 may extend over the second inner pivot surface 68 of the third coupling element 60 toward the axis A-A so that pivoting of the coupling members 22 is not impeded by the second inner pivot surfaces 68.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

Additionally, all of the disclosed features of an apparatus may be transposed, alone or in combination, to a method and vice versa.

The invention claimed is:

1. A coupling mechanism for engaging and disengaging a shaving cartridge of a shaving device, the coupling mechanism comprising:

a first coupling element having one or more first engagement surfaces configured to pivot about a pivot axis, the pivot axis being located external to the coupling mechanism;

a second coupling element including one or more second engagement surfaces configured to contact the one or more first engagement surfaces, the second coupling element being capable of moving in a first direction from a first position to a second position and in a second direction from the second position to the first position;

a third coupling element configured to support the first coupling element and the second coupling element, a stop positioned inwardly of the first coupling element configured to impede pivoting of the first coupling element; and wherein the stop impedes pivoting of the first coupling element when the second coupling element is in the first position and the stop no longer impedes movement of the first coupling element when the second coupling element is in the second position.

2. The coupling mechanism of claim 1, wherein the second coupling element is positioned inwardly of the first coupling element.

3. The coupling mechanism of claim 1, wherein the first coupling element includes one or more coupling members, the one or more coupling members include a peripheral attachment portion configured to be received by the shaving cartridge of the shaving device, and the peripheral attachment portion is offset inwardly of the pivot axis.

4. The coupling mechanism of claim 3, wherein the one or more coupling members comprise a first coupling member and a second coupling member, wherein the peripheral attachment portion comprises a first peripheral attachment portion and a second peripheral attachment portion, wherein the first coupling member includes the first peripheral attachment portion, wherein the second coupling member includes the second peripheral attachment portion, wherein the pivot axis comprises a first pivot axis and a second pivot axis, wherein the first coupling member pivots about the first pivot axis and the second coupling member pivots about the second pivot axis, and wherein a difference in a first distance between the first peripheral attachment portion and the second peripheral attachment portion and a second distance between the first pivot axis and the second pivot axis is in a range of 2.1 mm and 2.3 mm.

5. The coupling mechanism of claim 1, wherein the second coupling element includes a ramp and movement of an actuator along the ramp causes the second coupling element to move in the first direction from the first position toward the second position.

6. The coupling mechanism of claim 1, wherein the one or more second engagement surfaces come into contact with and applies a force on the one or more first engagement surfaces when the second coupling element is moving in the first direction.

7. The coupling mechanism of claim 3, wherein application of a force on the one or more first engagement surfaces cause the one or more coupling members to pivot and the peripheral attachment portion to move inwardly.

8. The coupling mechanism of claim 1, wherein the third coupling element is configured to be arranged in a stacked relationship with the first coupling element and the second coupling element.

9. The coupling mechanism of claim 8, wherein the first coupling element is configured to pivot along a surface of the third coupling element.

10. The coupling mechanism of claim 1, wherein the second coupling element is biased toward the first position by a bias member.

11. The coupling mechanism of claim 1, wherein the stop is included on the second coupling element.

12. The coupling mechanism of claim 3, wherein the one or more coupling members include a pair of opposing coupling members.

13. The coupling mechanism of claim 1, wherein the one or more second engagement surfaces are projections extending from the second coupling element.

14. A shaving device comprising the coupling mechanism of claim 1.

* * * * *